United States Patent
Choi

(10) Patent No.: US 7,173,669 B2
(45) Date of Patent: Feb. 6, 2007

(54) DIGITAL TELEVISION SYSTEM AND METHOD FOR SUPPORTING A FILM MODE

(75) Inventor: Seung Jong Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 519 days.

(21) Appl. No.: 10/657,095

(22) Filed: Sep. 9, 2003

(65) Prior Publication Data

US 2004/0046893 A1   Mar. 11, 2004

(30) Foreign Application Priority Data

Sep. 10, 2002   (KR) .................... 10-2002-0054622

(51) Int. Cl.
*H04N 5/46* (2006.01)
(52) U.S. Cl. .................. 348/555; 348/554; 348/448; 348/459
(58) Field of Classification Search ........ 348/448–452, 348/441, 458, 558, 554, 555, 556, 443, 423, 348/97, 98
See application file for complete search history.

(56) References Cited

U.S. PATENT DOCUMENTS

| | | | | |
|---|---|---|---|---|
| 4,881,125 A | * | 11/1989 | Krause | 348/448 |
| 5,689,301 A | * | 11/1997 | Christopher et al. | 348/97 |
| 6,078,725 A | * | 6/2000 | Tanaka | 386/100 |
| 6,670,996 B2 | * | 12/2003 | Jiang | 348/558 |

* cited by examiner

*Primary Examiner*—Michael H. Lee
(74) *Attorney, Agent, or Firm*—Birch, Stewart, Kolasch & Birch, LLP

(57) ABSTRACT

A digital TV system and a method for supporting a film mode in a digital TV system include generating an original frame from two fields except for repeated fields among 60 fields inputted in an interlaced scanning method if the film mode is detected, and converting the generated frames into 60 frames of a progressive scanning type by repeatedly outputting the generated frames three times or twice by a specified rule, setting an input audio signal to match the film mode in consideration of the number of speakers provided in the digital TV and the number of channels of the input audio signal, and displaying an icon for indicating the film mode on a predetermined position of a TV screen. Thus, a viewer can view the film with a higher picture quality and with reality through the DTV.

18 Claims, 6 Drawing Sheets

3:2 pull down detection and output format of 480P or 540P film mode icon display 20:9 picture position and size adjustment SRS truSurround 3:2 pull down detection and output format of 480P or 540P time display film mode icon display 20:9 picture position and size adjustment caption position adjustment SRS truSurround

DIGITAL TELEVISION SYSTEM AND METHOD FOR SUPPORTING A FILM MODE

This application claims the benefit of the Korean Application No. P 2002-54622 filed on Sep. 10, 2002, which is hereby incorporated by reference.

BACKGROUND OF THE INVENTION

1. Field of the Invention

The present invention relates to a digital television receiver (DTV), and more particularly to a digital TV system and a method for supporting a film mode which can adjust audio and video signals to optimum to the viewing of a film if a program inputted to the DTV or a signal fed to the DTV is judged to be originally made from the film (movie).

2. Discussion of the Related Art

With the development of the digital technology, the digital video technology has continuously been developed with the spread thereof being promoted. In the past, a video cassette recorder (VCR) was mainly used to view a movie at home, but recently, a digital versatile disc (DVD) has been spread and mainly used. Thus, the importance of the DVD is gradually being highlighted.

Also, as the demand for display appliances for displaying video and audio signals of a movie gradually increases, a DTV and a combined DVD and DTV (DVD+DTV), which support a DVD 480P output terminal, have been developed.

FIGS. 1A to 1C are views explaining methods of connecting a DVD and a DTV according to the related art. Specifically, FIG. 1A shows an example of a combined DVD and digital TV, FIG. 1B shows an example of a panel for connecting a 480i (where, 'i' indicates an interlaced scanning) CVBS (Composite Video Broadcasting) signal of a 480i CVBS DVD and a stereo audio signal, and FIG. 1C shows an example of a panel for connecting a 480p (where, 'p' indicates a progressive scanning)/480i component signal of a 480p/480i component DVD and a SPDIF/stereo audio signal.

FIG. 2 illustrates an example of a method of transmitting a film picture to a DTV or storing the film picture in a DVD using an MPEG-2 compression technique.

That is, in the case of the DVD appliance having no component signal as shown in FIG. 1B, the video and audio signals are connected to the DTV through corresponding terminals as a CVBS signal and a stereo signal, respectively. In processing an audio output signal, it is possible to use a 5.1-channel if the DVD appliance has an SPDIF output terminal.

Also, in the case of the DVD appliance that supports an output of components (YPbPr) as shown in FIG. 1C, the video and audio signals are connected to the DTV through the corresponding terminals as three component signals (Y, Pb, and Pr) and a stereo signal, respectively, to view the video signal.

Meanwhile, in the case of the movie, it is most realistic to film a moving picture composed of 24p (i.e., 24 frames and a progressive scanning type) and then to view the filmed moving picture in a theater through a movie projector. However, in the case of storing or reproducing such a film signal through a DVD appliance, a video signal process of 30i (i.e., 30 frames and an interlaced scanning type) is performed as shown in FIG. 2.

Specifically, each frame (composed of top and bottom fields) is processed to include three or two fields as follows:

In the first frame, three fields 1T, 1B and 1T are processed through repeating of the top field.

In the second frame, two fields 2B and 2T are processed using the top/bottom field of the corresponding frame.

In the third frame, three fields 3B, 3T and 3B are processed through repeating of the bottom field.

In the fourth frame, two fields 4T and 4B are processed using the top/bottom field of the corresponding frame.

Through the above-described process, the original 24 frames of the film are processed to be 30 frames (i.e., 60 fields).

That is, the process converts the two frames of 24 Hz into 5 fields of 60 Hz in a manner that in the first frame, three fields are produced through repeating of one field, and in the second frame, two fields are produced. This process is called a 3:2 pull-down process.

If the signal produced as described above is not particularly processed in the DVD appliance or in the DTV that receives and displays an output signal of the DVD appliance, it gives no feeling as if it was viewed in the theater since it is not distinguishable from a broadcasting signal of 30i (i.e., 30 frames and an interlaced scanning type). That is, since there is no distinction between the broadcasting signal and a film signal, the film signal is not specially processed in distinction from the broadcasting signal in the DVD. Also, due to the characteristic of the interlaced scanning type, flickering may occur in a displayed picture.

SUMMARY OF THE INVENTION

Accordingly, the present invention is directed to a digital TV system and a method for supporting a film mode that substantially obviate one or more problems due to limitations and disadvantages of the related art.

An object of the present invention is to provide a digital TV system and a method for supporting a film mode which can adjust audio and video signals to optimum to the viewing of a film if a program inputted to the DTV or a signal fed to the DTV is judged to be originally made from the film (movie).

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a digital TV system for supporting a film mode, includes a film mode detection unit for detecting whether a picture received from an input video signal corresponds to a film, a film mode processing unit for generating an original frame from two fields except for repeated fields among N fields inputted in an interlaced scanning method if the film mode is detected by the film mode detection unit, and converting the generated frames into N frames of a progressive scanning type by repeatedly outputting the generated frames three times or twice by a specified rule, an audio signal processing unit for setting an input audio signal to match the film mode in consideration of the number of speakers provided in the digital TV and the number of channels of the input audio signal if the film mode is detected by the film mode detection unit, and an OSD processing unit for displaying an icon for indicating the film mode on a predetermined position of a TV screen if the film mode is detected by the film mode detection unit.

The film mode detection unit detects the film mode if the input video signal or decoded video signal is of the interlaced scanning type and one field of the video signal is repeatedly inputted for a predetermined period.

The film mode detection unit detects the film mode from header information of an MPEG stream if the input video signal is compressed as an MPEG type.

The OSD processing unit displays caption data included in a DVD stream on the predetermined position of the TV screen in the form of an OSD if the video signal is inputted from a DVD in the film mode.

The OSD processing unit displays time information included in a DVD stream on the predetermined position of the TV screen in the form of an OSD if the video signal is inputted from a DVD in the film mode.

In another aspect of the present invention, a method for supporting a film mode in a digital TV system, includes detecting whether a picture received from an input video signal corresponds to the film mode, generating an original frame from two fields except for repeated fields among N fields inputted in an interlaced scanning method if the film mode is detected, and converting the generated frames into N frames of a progressive scanning type by repeatedly outputting the generated frames three times or twice by a specified rule, setting an input audio signal to match the film mode in consideration of the number of speakers provided in the digital TV and the number of channels of the input audio signal if the film mode is detected, and displaying an icon for indicating the film mode on a predetermined position of a TV screen if the film mode is detected.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1A illustrates an example of a combined DVD and digital TV, FIG. 1B illustrates an example of a panel for connecting a 480i CVBS signal of a DVD and a stereo audio signal, and FIG. 1C illustrates an example of a panel for connecting a 480p/480i component signal of a DVD and a SPDIF/stereo audio signal;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The present invention is characterized by detecting whether a video signal inputted from a popular DTV or a combined DVD+DTV corresponds to a film mode, and if the film mode is detected, setting audio and video signals to optimum to the viewing of the film. Also, the present invention is characterized by displaying an icon for indicating the film mode on a predetermined position (for example, a right upper part) of a TV screen so that a user can recognize that the present picture is a film picture.

For this, it should be detected whether the input video signal originally corresponds to the film, and this is called a film mode detection or 3:2 pull-down detection. In the embodiment of the present invention, if the film mode is detected, the input video signal of 30i is converted into that of 24p, and a video signal of 60p (i.e., 60 frames and a progressive scanning type) is produced and displayed by repeatedly outputting the video signal of 24p with a specified rule, so that the displayed picture is optimum to the viewing of the film.

Figure 1A:
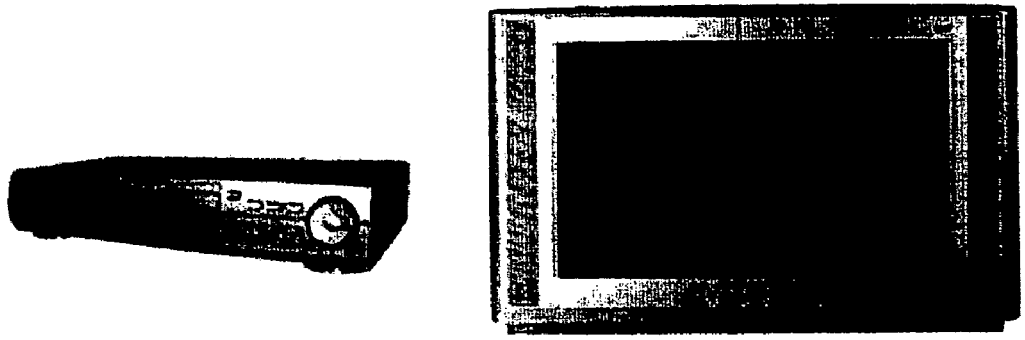
FIGS. 1A to 1C are views explaining methods of connecting a DVD and a DTV according to the related art, where.
Figure 1B:
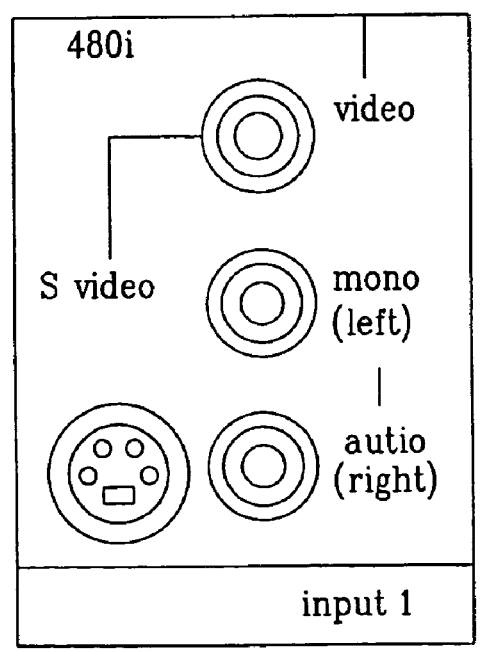
Figure 1C:
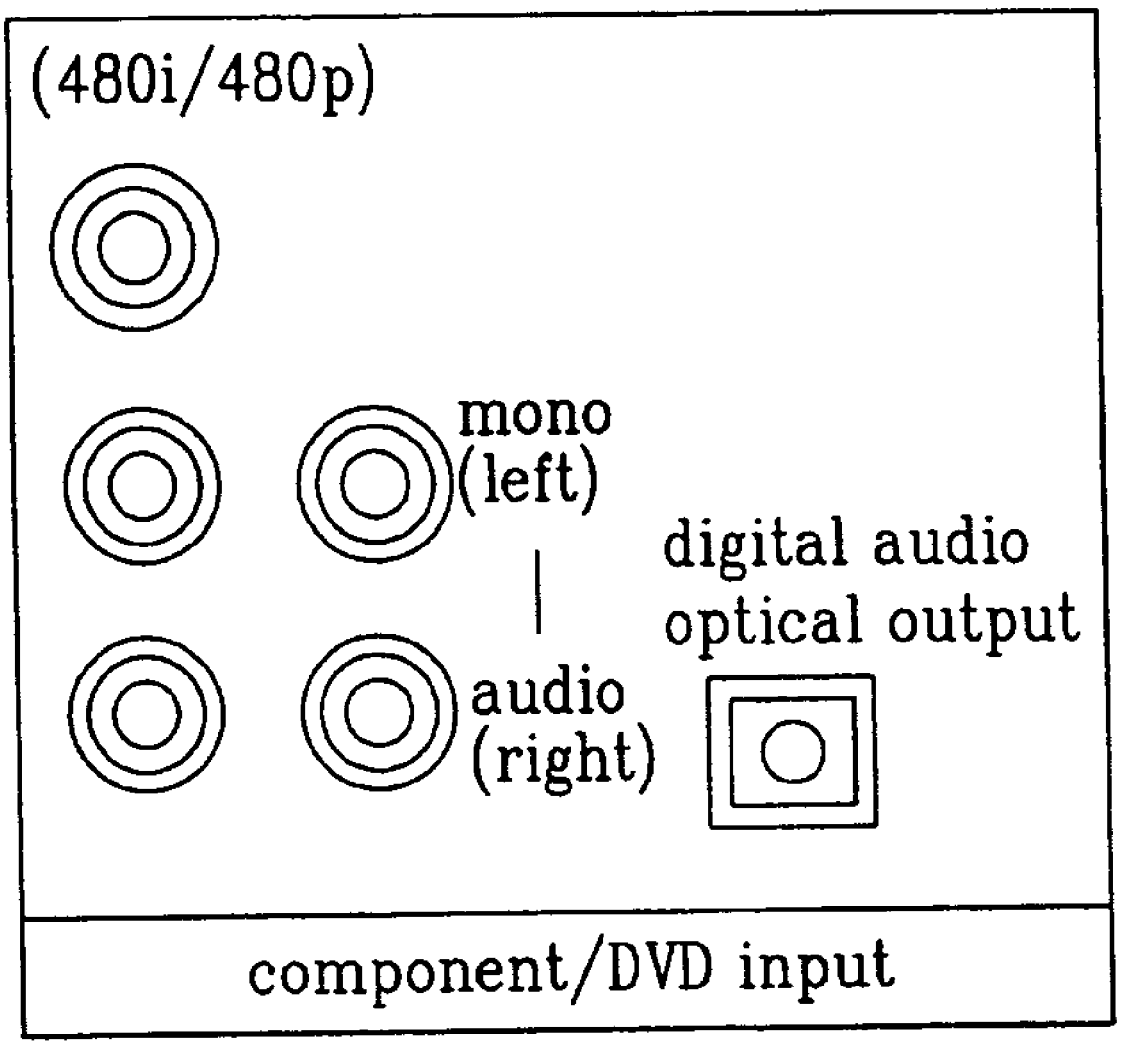
Figure 2:
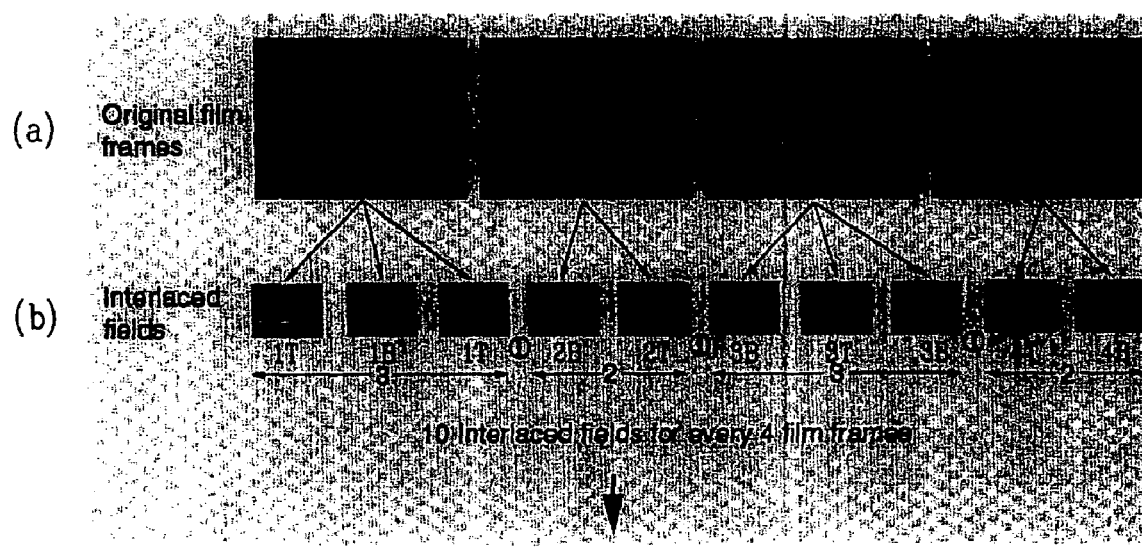
FIG. 2 illustrates an example of a method of transmitting a film picture to a DTV or storing the film picture in a DVD using an MPEG-2 compression technique.
Figure 3:
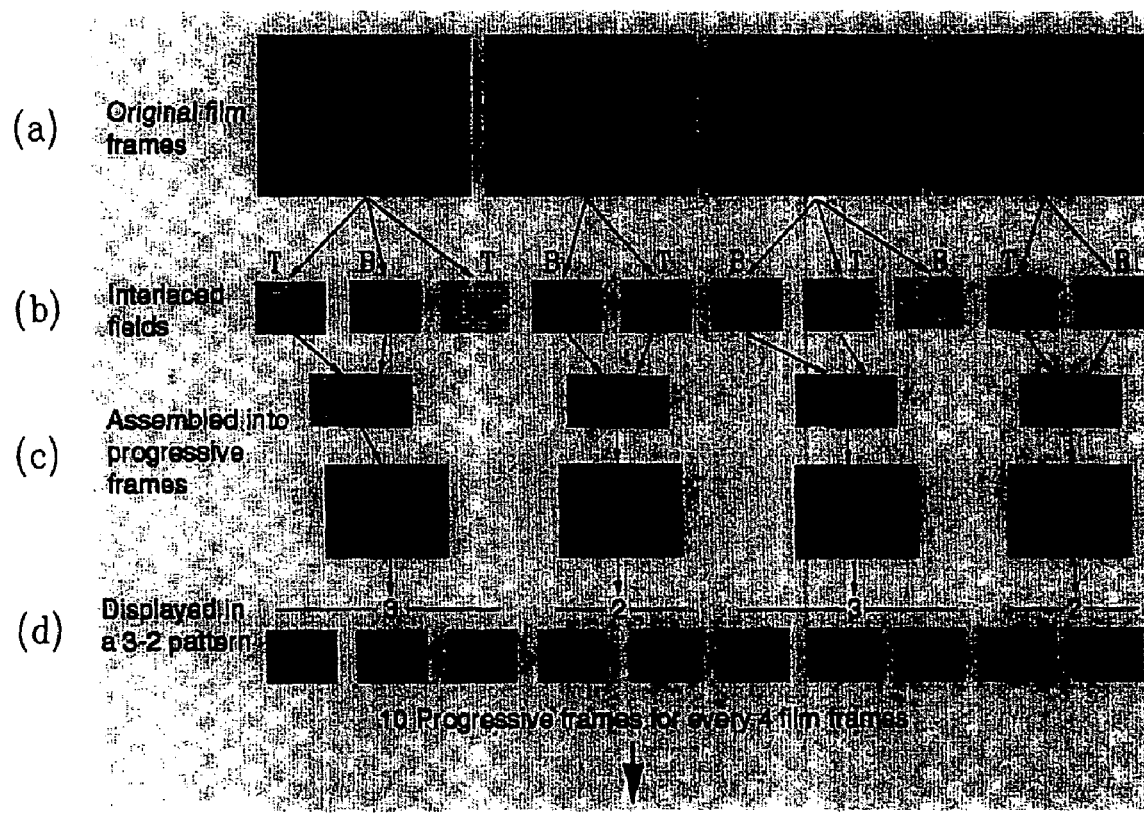
FIG. 3 illustrates a process of converting an input video signal of 30i into a video signal of 24p and then to a video signal of 60p when the film mode is detected according to the present invention.

FIG. 3 illustrates a process of converting an input video signal of 30i into a video signal of 24p and then into a video signal of 60p when the film mode is detected according to the present invention.

As shown in FIG. 3, if a video signal inputted from a broadcasting station or through the DVD corresponds to a film, it is composed of 24 frames (24p) per second as shown as (a) in FIG. 3. In order to reflect this to the digital TV, as shown (b) in FIG. 3, three fields are prepared by repeating one field in one frame, and then two fields are prepared in the next frame, so that the film signal composed of 24 frames (24p) per second is converted into a signal composed of 60 fields per second, i.e., 30i, and then transmitted. The above-described process (b) of FIG. 3 is called a 3:2 pull-down process.

Then, the digital TV, which received the converted signal, detects if the input signal corresponds to a film mode, and if it is detected that the input signal corresponds to the film mode, it converts the signal of 30i into a signal of 24p by generating the original frame from the two fields as skipping the repeated fields as shown as (c) in FIG. 3. The converted frames of 24p are repeatedly outputted three times or twice by a specified rule to be displayed as a signal of 60p as shown as (d) in FIG. 3.

Hereinafter, the process of detecting a film mode will be explained in detail using two embodiments. One embodiment corresponds to the case that the input video signal is in the form of a CVBS or YPbPr signal, and the other embodiment corresponds to the case that the input video signal is a PS (Program Stream) or TS (Transport Stream) of MPEG-2.

First, in the case that the input video signal is in the form of a CVBS or YPbPr signal, it is detected that the input video signal corresponds to the film mode if the video signal is inputted as the fields are repeated for a predetermined period as follows:

In the first frame, 1T, 1B, 1T;
In the second frame, 2B, 2T;
In the third frame, 3B, 3T, 3B;
In the fourth frame, 4T, 4B;
. . .

That is, in the first frame (1T, 1B, 1T) and in the third frame (3B, 3T, 3B), 1T and 3B are transmitted twice, and thus if the same field is transmitted twice or if the period is as described above, it is detected that the input video signal corresponds to the film mode.

Also, in the case that the input video signal is in the form of a DVD stream (i.e., PS of MPEG-2) or DTV broadcasting stream (i.e., TS of MPEG-2), the film mode detection method can detect the film mode using a header of the MPEG-2 steam or a decoded video signal.

In the case of using the header of the MPEG-2 stream, the film mode is detected using a top_first_field value and a repeat_first_field value in the header.

Specifically, in the case of the film mode, the following values are set:

First frame: top_first_field=1, repeat_first_field=1
Second frame: top_first_field=0, repeat_first_field=0
Third frame: top_first_field=0, repeat_first_field=1
Fourth frame: top_first_field=1, repeat_first_field=0

Accordingly, if the top_first_field and the repeat_first_field in the MPEG-2 header have the values and period as above, it is detected that the input video signal corresponds to the film mode.

In the case of using the decoded video signal, the film mode is detected in the same manner as that in the case that the input video signal is the CVBS or YPbPr signal.

That is, in the first frame (1T, 1B, 1T) and in the third frame (3B, 3T, 3B), 1T and 3B are transmitted twice, and thus if the same field is transmitted twice and if the period is as described above, it is detected that the input video signal corresponds to the film mode.

If the film mode is detected through the above-described process, the process of making the original frame by skipping the repeated fields for each frame and adding the two fields, which are not skipped, is repeated to convert the video signal of 60 fields into the video signal of 24 frames. Then, the video signal of 24 frames is converted into the video signal of 60 frames by repeatedly outputting each of the 24 frames three times or twice according to a predetermined rule, and the 60 frames per second are displayed in a progressive scanning method.

① The first frame is produced by adding 1T and 1B, and then displayed three times.

② The second frame is produced by adding 2T and 2B, and then displayed twice.

③ The third frame is produced by adding 3T and 3B, and then displayed three times.

④ The fourth frame is produced by adding 4T and 4B, and then displayed twice.

1T and 3B, which are repeated in the above-described process, are not used for the generation of 24p.

Meanwhile, the audio signal is optimally set in consideration of the number of speakers (for example, 2 or 6 speakers) provided in the DTV and the number of channels (for example, 5.1 channels or 2 channels) of an input audio signal. That is, in the case that the DTV has two speakers, an audio signal is processed in a manner that the 5.1-channel type is converted into the 2-channel type. That is, since the film mostly adopts a 5.1-channel type audio signal, the DTV supporting only two speakers cannot sufficiently output the audio sound. In order to solve this problem, various audio processing techniques for outputting the 5.1-channel type audio signal through 2 channels have been developed. For example, the "trusurround" algorithm produced by SRS Company has been developed, by which the audio signal can be optimally processed to be suitable for the film.

Figure 4:
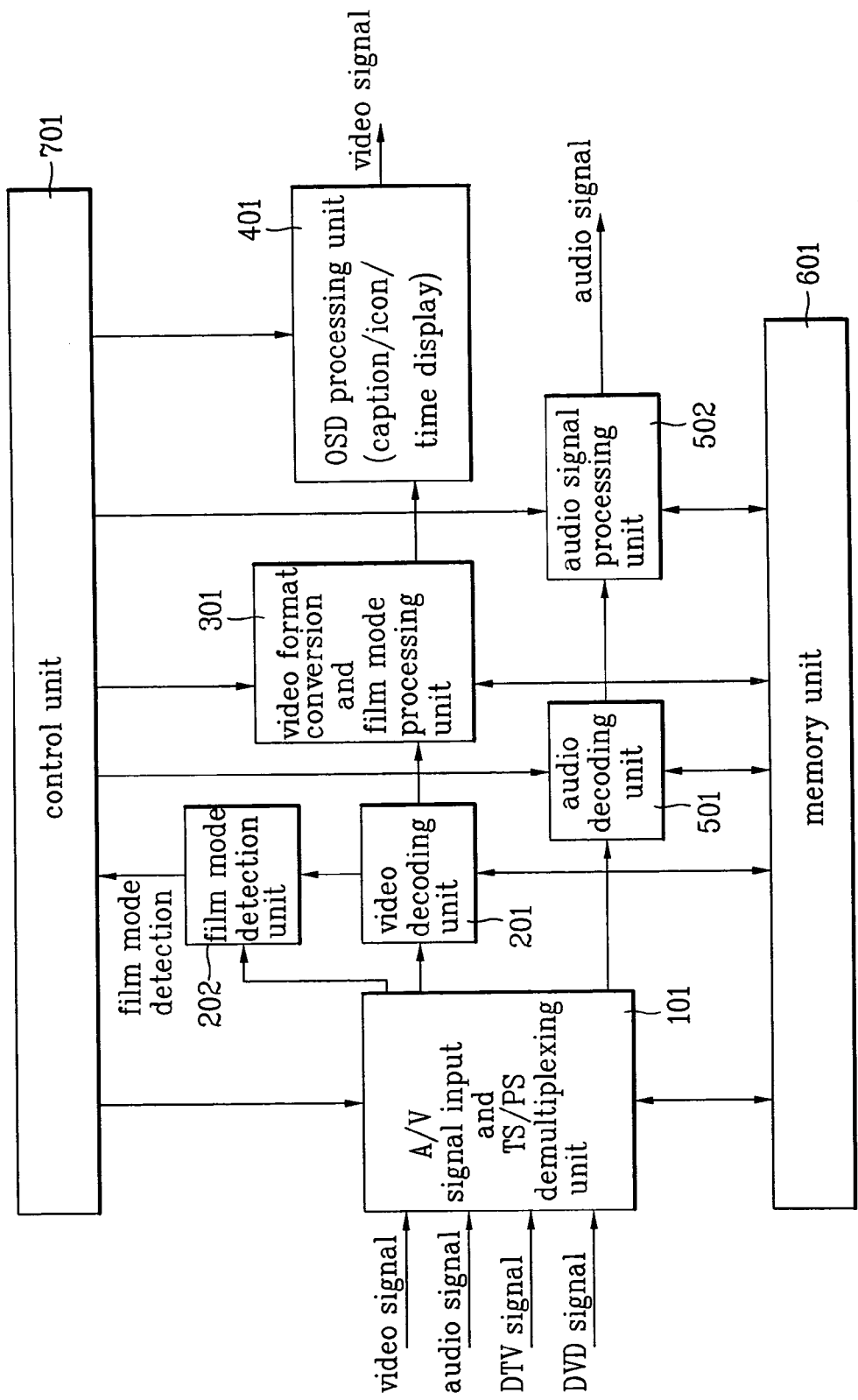
FIG. 4 illustrates a block diagram of a digital TV system that supports the film mode according to the present invention.

FIG. 4 illustrates a block diagram of a digital TV or a combined DVD+DTV that performs the above-described process according to the present invention.

As shown in FIG. 4, the DTV or combined DVD+DTV includes an audio/video (A/V) signal input and demultiplexing unit 101 for receiving a video signal, an audio signal, a DTV signal, a DVD signal, etc., separating the input signal into video and audio signals if the input signal is in the form of a stream, and outputting the video and audio signals, a video decoding unit 201 for receiving a compressed video signal from the A/V signal input and demultiplexing unit 101 and restoring the video signal to pixel values of an original picture by decoding the video signal, a film mode detection unit 202 for receiving a composite video signal from the A/V signal input and demultiplexing unit 101, and detecting a film mode by judging whether any field of the input signal is repeated for a predetermined period if the input signal is in the form of a composite video broadcasting signal (CVBS) or YPbPr signal, or detecting the film mode from header information top_first_field and repeat_first_field of an MPEG-2 stream or the video signal decoded by the video decoding unit 201 if the input signal is in the form of an MPEG-2 stream, an audio decoding unit 501 for restoring the audio signal outputted from the A/V signal input and demultiplexing unit 101 to an original audio signal by decoding the audio signal if the audio signal is compressed, an audio signal processing unit 502 for optimizing the compressed audio signal to match the film mode if the input signal corresponds to the film mode, and then analogizing the optimized audio signal, a video format conversion and film mode processing unit 301 for converting a format of the signal decoded by the video decoding unit 201 into a format of an output device, generating an original frame from two fields except for repeated fields among 60 fields inputted in an interlaced scanning method if the input signal corresponds to the film mode, and converting the generated frames into 60 frames of the interlaced scanning type by repeatedly outputting the generated frames three time or twice by a determined rule, an OSD processing unit 301 for displaying a caption, an icon, a time, etc., on a DTV screen in the form of an OSD if the film mode is detected, and a control unit 701 for optimizing setting of the audio and video signals to match the film mode by controlling the film mode processing unit 301, the audio signal processing unit 502, and the OSD processing unit 401 if the film mode detection unit 202 detects the film mode.

A memory unit 601 not explained is an external memory, and may comprise a DRAM (or SDRAM) to store the input bitstream and frame buffers for motion compensation. Especially, in the case of the video decoder, the external memory mainly used for write/read of the bitstream for video decoding, data read required for the motion compensation, write of the decoded data, and read of the date to be displayed, and sends/receives data through a memory interface.

The present invention as constructed above detects whether the input signal corresponds to the film mode, and if the film mode is detected, sets the video and audio signals optimum to the viewing of the film.

The above process may be performed through a DTV or a combined DVD+DTV.

Figure 5:
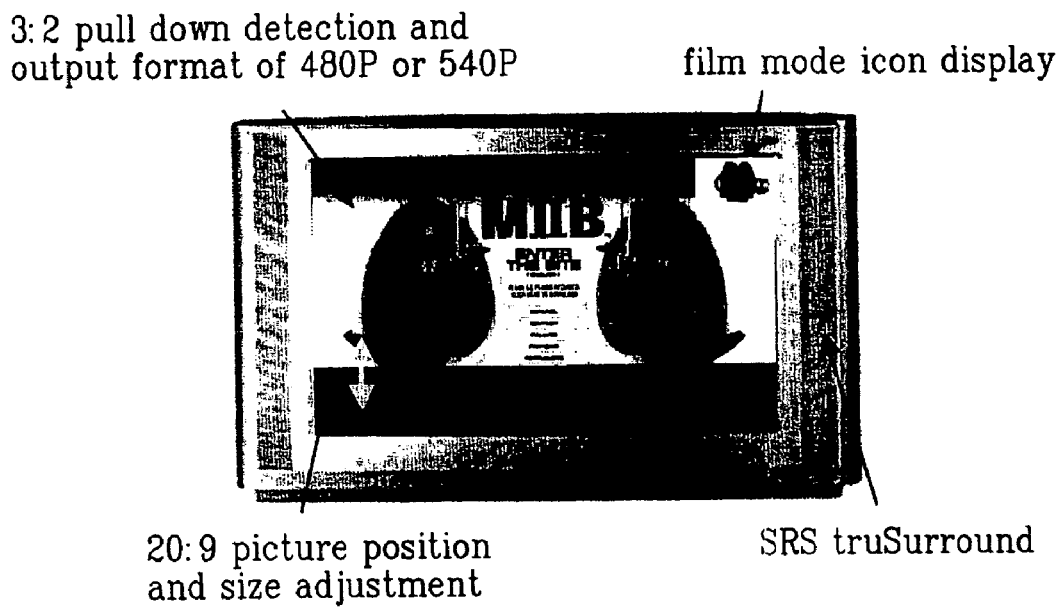
FIG. 5 illustrates an example of a display form of a film mode in a DTV according to the present invention.
Figure 6:
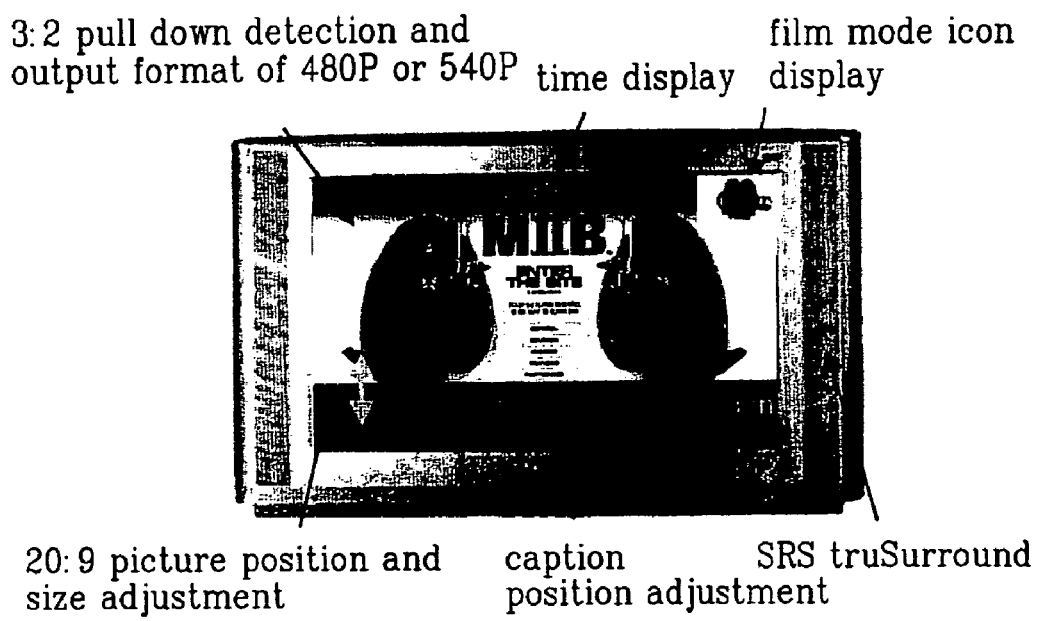
FIG. 6 illustrates an example of a display form of a film mode in a combined DVD+DTV according to the present invention.

FIG. 5 illustrates an example of the display form in the film mode of the DTV according to the present invention, and FIG. 6 illustrates an example of the display form in the film mode of the combined DVD+DTV according to the present invention.

First, the process through the DTV will be explained with reference to FIG. 5.

Input video signal: CVBS or YPbPr signal

Input audio signal: Stereo-2 channel or SPDIF signal

1. Film input detection: The film mode (i.e., input of 24p video signal) is detected among the input video signal.

That is, if the video signal inputted to the A/V signal input and demultiplexing unit 101 is in the form of YCbCr422 (e.g., in the case of the CVBS signal, the input signal is converted into YCbCr422 through an NTSC decoder), the A/V signal input and demultiplexing unit 101 outputs the input signal to the film mode detection unit 202 in order to detect the film mode, and simultaneously stores the video and audio signals in the memory unit 601.

The film mode detection unit 202 detects whether the input signal corresponds to the film mode, i.e., if the 24p video signal is converted into 30i video signal.

As described above, the film mode detection is performed through confirming whether the same field is transmitted twice along with its period, since in the first frame (1T, 1B, 1T) and in the third frame (3B, 3T, 3B), 1T and 3B are transmitted twice.

If the film mode is detected, the film mode detection unit 202 output a film mode detection signal to the control unit 701. The control unit 701 controls the video format conversion and film mode processing unit 301 and the audio signal processing unit 502 in order to set the video and audio signals to match the film mode. Also, the film mode detection unit 202 controls the OSD processing unit 401 in order to display the icon that indicates the film mode.

2. Icon display: If the video and audio signals correspond to the film dedicated mode, the icon that indicates the film dedicated mode is displayed.

That is, the OSD processing unit 401 displays the icon that indicates the film dedicated mode on a specified position (for example, upper right part) of the TV screen under the control of the control unit 701.

3. Optimum setting of the video signal:

The video format conversion and film mode processing unit 301 receives the video signal from the memory unit 601 under the control of the control unit 701, and converts the 60-field (i.e., 30i) video signal into a 24-frame video signal by repeating a process of producing the original frame in a manner that repeated fields are skipped for each frame and two fields, which are not skipped, are added together. Then, the video format conversion and film mode processing unit 301 converts the 24 frame video signal into the 60-frame video signal by repeatedly displaying the 24 frames three times or twice according to a predetermined rule, so that the 60 frames per second are displayed in a progressive scanning method.

The first frame is produced by adding 1T and 1B, and then displayed three times.

The second frame is produced by adding 2T and 2B, and then displayed twice.

The third frame is produced by adding 3T and 3B, and then displayed three times.

The fourth frame is produced by adding 4T and 4B, and then displayed twice.

Thereafter, the video format conversion and film mode processing unit 301 sets its output format to 480p or 540p under the control of the control unit 701. Also, it sets a color coordinate to be optimum to the viewing of the film.

Here, the term '480p' means an ED (Extended Definition), and is 720×480 60p (4:3) or 854×480 60p (16:9). Also, the term '540p' means an HD (High Definition), and is 1920×540 60p (16:9).

4. Optimum setting of the audio signal:

The audio signal processing unit 502 receives the audio signal from the memory unit 601 under the control of the control unit 701, and optimally sets the audio signal in consideration of the number of speakers (for example, 2 or 6 speakers) provided in the DTV and the number of channels (for example, 5.1 channels or 2 channels) of the input audio signal. For example, in the case that the DTV has only two speakers, the audio signal is processed in a manner that the 5.1-channel type is converted into the 2-channel type using the truSurround algorithm of SRS Company.

Next, the process through the combined DVD+DTV will be explained with reference to FIG. 6.

Input video signal: DVD stream (in the form of a PS of MPEG-2), DTV broadcasting stream (in the form of a TS of MPEG-2)

Input audio signal: Stereo-2 channel or SPDIF signal

1. Film input detection: The film mode (i.e., input of 24p video signal) is detected among the input video signal.

Since the input signal is in the form of an A/V multiplexed stream, the A/V signal input and demultiplexing unit 101 separates the input signal into audio and video signals, and inputs the audio signal and the video signal to the audio decoder 501 and the video decoder 201, respectively. The audio decoder 501, for example, decodes the audio signal using a Dolby AC (Audio Coding)-3 algorithm, and outputs the decoded audio signal to the audio signal processing unit 502, while the video decoder 201 decodes the video signal using an MPEG-2 algorithm, and outputs the decoded video signal to the video format conversion and film mode processing unit 301.

At this time, the film mode detection unit 202 detects whether the signal inputted from the output of the video decoding unit 201 corresponds to the film mode using the two detection methods as described above. That is, the film mode is detected from the header information (i.e., top_first_field and repeat_first_field) of the MPEG-2 stream, or from the decoded video signal.

First, in the case of using the header information of the MPEG stream, the film mode is detected if the header information has the following values and the period is repeated:

First frame: top_first_field=1, repeat_first_field=1

Second frame: top_first_field=0, repeat_first_field=0

Third frame: top_first_field=0, repeat_first_field=1

Fourth frame: top_first_field=1, repeat_first_field=0

Meanwhile, in the case of using the decoded video signal, the film mode is detected if the input video signal has a first frame of 1T, 1B and 1T, a second frame of 2B and 2T, a third frame of 3B, 3T and 3B, and a fourth frame of 4T and 4B.

That is, in the first frame (1T, 1B, 1T) and in the third frame (3B, 3T, 3B), 1T and 3B are transmitted twice, and thus if the same field is transmitted twice and if the period is as described above, it is detected that the input video signal corresponds to the film mode.

If the film mode is detected, the film mode detection unit 202 output a film mode detection signal to the control unit 701. The control unit 701 controls the video format conversion and film mode processing unit 301 and the audio signal processing unit 502 in order to set the video and audio signals to match the film mode. Also, the film mode detection unit 202 controls the OSD processing unit 401 in order to display the icon that indicates the film mode and to process time, caption, etc.

2. Icon display:

The OSD processing unit 401 displays the icon that indicates the film dedicated mode on a specified position (for example, upper right part) of the TV screen under the control of the control unit 701.

3. Optimum setting of the video and audio signals is the same as that in the case of the DTV, and the explanation thereof will be omitted.

4. Caption display position: The caption of the film is displayed on a position desired by a user.

The caption signal included in the stream of the DVD is decoded by the control unit 701, and then displayed in the form of an OSD by the OSD processing unit 401. The caption data is transmitted as a sub-picture, and the position of the caption display can be adjusted according to the user's convenience.

5. Time display: The running time of the film is displayed.

In the same manner as the caption position, the time information included in the stream of the DVD is decoded by the control unit 701, and then displayed in the form of an OSD by the OSD processing unit 401. The time display position and display form can be adjusted according to the user's convenience.

Especially, the present invention provides the conversion of a 24-frame video signal into a 60-field video signal, and thus can be effectively adopted to a general digital TV or a combined DVD+DTV that receive and display the 24-frame video signal as it is, for example, a DTV or a combined DVD+DTV that receive and display a 480I CVBS signal or a component signal. In this case, the DTV detects the film mode and produces a 60p video signal by applying the above-described process.

Through the above-described process, it is most preferable that the DTV has the following output formats:

①  720×480 60p (4:3) or 854×480 60p (16:9)
②  1920×1080 30i (16:9) or 1920×540 60p (16:9): This corresponds to the HD-class display, and 1920×1080 30i is used for the HD-class input video signal, while 1920×540 60p is used for the NTSC or DVD input video signal.

As described above, according to the digital TV system supporting the film mode according to the present invention, a film dedicated mode is added to the DTV, and if the film signal is inputted, the film mode is informed to the user through the display of an icon. Also, by setting the audio and video signals to optimum to the viewing of the film, the film can be viewed with a higher picture quality and with reality through the DTV. Also, by applying the present invention to a combined DVD+DTV and a DTV A/V ASIC supporting the combined DVD+DTV, the cost can be greatly reduced.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A digital TV system for supporting a film mode, comprising:
    a film mode detection unit for detecting whether a decoded video signal received in the form of TS (transport stream) or an input video signal received in the form of CVBS or YPbPr component corresponds to a film;
    a film mode processing unit for generating an original frame from two fields except for repeated fields among N fields inputted in an interlaced scanning method if the film mode is detected by the film mode detection unit, and converting the generated frames into N frames of a progressive scanning type by repeatedly outputting the generated frames three times or twice by a specified rule; and
    an OSD processing unit for displaying an icon for indicating the film mode on a predetermined position of a TV screen if the film mode is detected by the film mode detection unit.

2. The digital TV system of claim 1, wherein the film mode detection unit detects the film mode if the input video signal or decoded video signal is of the interlaced scanning type and one field of the video signal is repeatedly inputted for a predetermined period.

3. The digital TV system of claim 1, wherein the film mode detection unit detects the film mode from header information top_first_field and repeat_first_field of an MPEG stream if the input video signal is compressed by an MPEG system.

4. The digital TV system of claim 1, wherein the OSD processing unit displays caption data included in a DVD stream on the predetermined position of the TV screen in the form of an OSD if the video signal is inputted from a DVD in the film mode.

5. The digital TV system of claim 1, wherein the OSD processing unit displays time information included in a DVD stream on the predetermined position of the TV screen in the form of an OSD if the video signal is inputted from a DVD in the film mode.

6. The digital TV system of claim 1, further comprising an audio signal processing unit for setting an input audio signal to match the film mode in consideration of the number of speakers provided in the digital TV and the number of channels of the input audio signal if the film mode is detected by the film mode detection unit.

7. A digital TV system for supporting a film mode, comprising:
    an audio/video (A/V) signal input and demultiplexing unit for receiving and multiplexing a video signal, an audio signal, a DTV signal, and a DVD signal;
    a video decoding unit for receiving a compressed video signal from the A/V signal input and demultiplexing unit, and restoring the video signal to pixel values of an original picture by decoding the video signal;
    a film mode detection unit for receiving a video signal from the A/V signal input and demultiplexing unit or the video decoding unit, and detecting a film mode;
    an audio decoding unit for decoding and restoring the audio signal to the original audio signal if the audio signal outputted from the A/V signal input and demultiplexing unit is compressed;
    an audio signal processing unit for optimizing the decoded audio signal to match the film mode if the input signal corresponds to the film mode, and then analogizing the optimized audio signal;
    a video format conversion and film mode processing unit for converting a format of the signal decoded by the video decoding unit into a format of an output device, and converting the video signal into 60 frames of an progressive scanning type in the film mode;
    an OSD processing unit for displaying a caption, an icon, and a time on a DTV screen in the form of an OSD if the film mode is detected; and
    a control unit for optimizing setting of the audio and video signals to match the film mode by controlling the film mode processing unit, the audio signal processing unit and the OSD processing unit if the film mode detection unit detects the film mode.

8. The digital TV system of claim 7, further comprising a memory for storing input bitstreams and frame buffers for motion compensation.

9. The digital TV system of claim 7, wherein if the input signal is in the form of a CVBS or YPbPr, the film mode detection unit detects the film mode by judging whether a field is repeated for a predetermined period.

10. The digital TV system of claim 7, wherein if the input signal is in the form of an MPEG-2 stream, the film mode detection unit detects the film mode using header information of the MPEG-2 stream.

11. The digital TV system of claim 10, wherein the film mode detection unit detects the film mode if a top_first_field and a repeat_first_field in a header of an MPEG-2 stream have a predetermined period.

12. A method for supporting a film mode in a digital TV system, comprising:
  a first step of detecting whether a picture received from an input video signal corresponds to the film mode;
  a second step of converting N fields inputted in an interlaced scanning method into M frames of a progressive scanning type if the film mode is detected at the first step;
  a third step of setting an input audio signal to match the film mode in consideration of the number of speakers provided in the digital TV and the number of channels of the input audio signal if the film mode is detected at the first step; and
  a fourth step of displaying an icon for indicating the film dedicated mode on a predetermined position of a TV screen if the film mode is detected at the first step.

13. The method of claim 12, wherein, in the case that the input signal is in the form of a CVBS or YPbPr, the first step detects the film mode if a field is repeated for a predetermined period.

14. The method of claim 12, wherein, in the case that the input signal is in the form of an MPEG-2 stream, the first step detects the film mode using header information of the MPEG-2 stream if the header information has a predetermined period.

15. The method of claim 12, wherein the second step generates the original frame from two field except for repeated frames among the N fields inputted in the interlaced scanning method, and converting the generated frames into the M frames of the progressive scanning type by repeating the generated frame three times or twice by a determined rule.

16. The method of claim 15, wherein the second step generates the original 24 frames except for the repeated fields among the 60 fields inputted in the interlaced scanning method, and converting the generated 24 frames into the 60 frames of the progressive scanning type by repeating the generated frames three times or twice by the determined rule.

17. The method of claim 12, wherein the fourth step displays caption data included in a DVD stream on the predetermined position of the TV screen in the form of the OSD if the input video signal corresponds to the film mode and the video signal is inputted from a DVD.

18. The method of claim 12, wherein the fourth step displays time information included in a DVD stream on the predetermined position of the TV screen in the form of the OSD if the input video signal corresponds to the film mode and the video signal is inputted from a DVD.

* * * * *